W. McLUCAS.
Corn Planter.
No. 79,998.
Patented July 14, 1868.
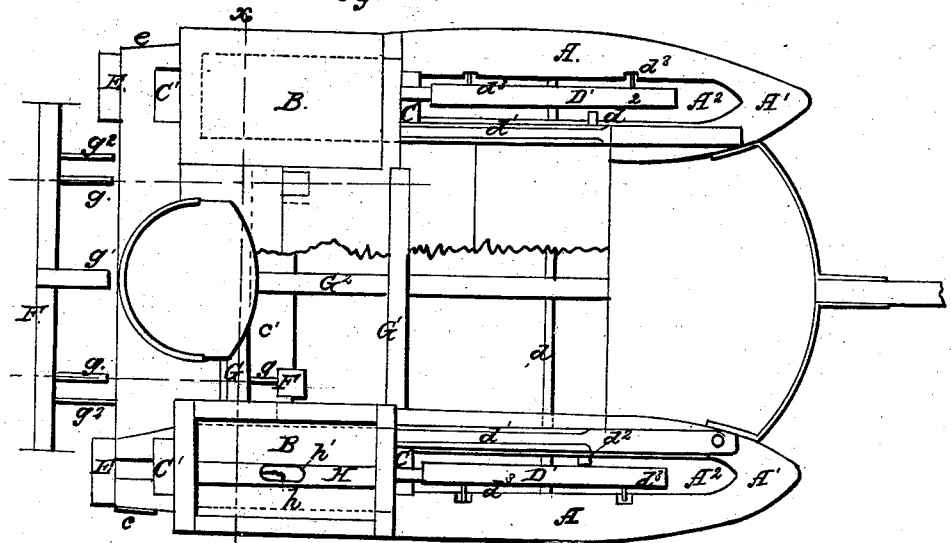
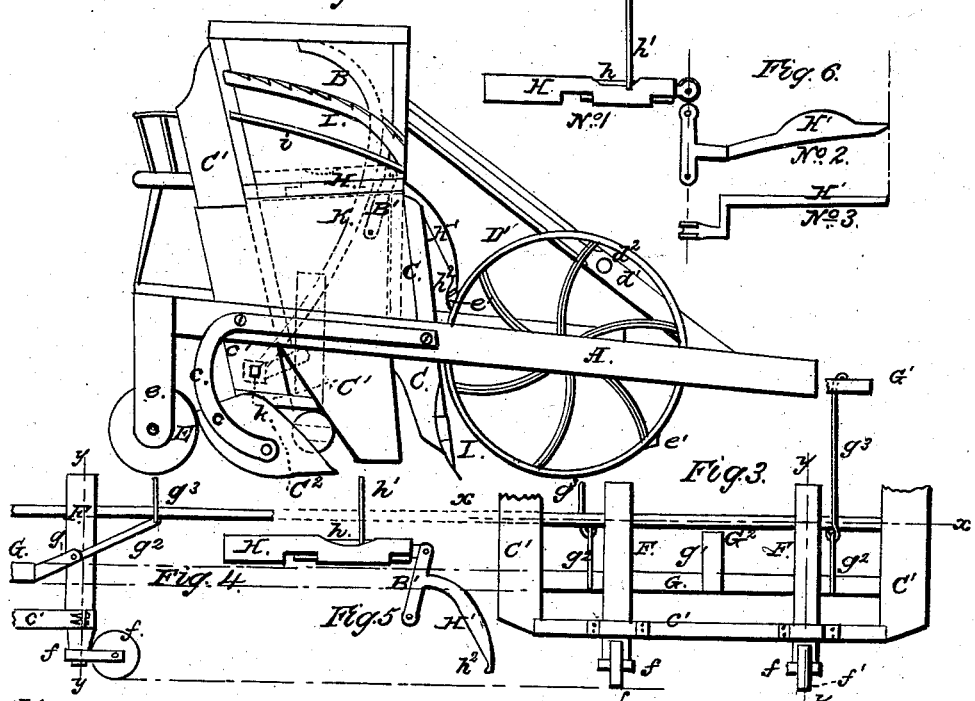

United States Patent Office.

WILLIAM McLUCAS, OF REINERSVILLE, OHIO.

Letters Patent No. 79,998, dated July 14, 1868.

---

IMPROVEMENT IN DOUBLE CORN-PLANTER.

---

The Schedule referred to in these Letters Patent and making part of the same.

---

TO ALL WHOM IT MAY CONCERN:

Be it known that I, WILLIAM McLUCAS, of Reinersville, county of Morgan, and State of Ohio, have invented certain new and useful Improvements in Double Corn-Planters; and I do hereby declare that the following is a full, clear, and exact description of the same, reference being had to the accompanying drawing, and the letters of reference marked thereon, making part of this specification, in which—

Figure 1 is a plan view.
Figure 2 is a side view.
Figure 3 is an end view.
Figure 4 is a view, showing the mechanism by which the machine is raised from the ground.
Figure 5 is a side view of the tube and arm, by which the regulation and flow of the grain are controlled.
Figure 6 is a plan view of the same.

In my patent, dated February 4, 1868, by means of the double-valve action, so common in powder-spouts and other equivalent devices, a certain and measured quantity of grain is, at regular intervals, discharged to the ground hills. This double-valve action has proved, by practical experience, to be most effective.

What I now desire to secure by Letters Patent might almost be called an equivalent of the same device, but the mechanism being so entirely different, I desire to cover it by a patent.

Instead of the double valve I insert, in the base of the distributing-hopper, a tube, in which works an angular arm, having corrugations to conform to the angular corrugations of the tube. This is controlled by means of an outside lever, whose outer arm is so arranged as to strike flanges on the driving-wheel. The slots in the tube and in the roller within are so arranged as to be coincident, whereby the grain, when it falls, can readily be distributed; its action, however, depending entirely upon the revolutions of the driving-wheel or the wheel in front of the machine, when the flanges of the same strike the extended lever. But, however, the action of the entire mechanism can be controlled by an upright needle or arm, whereby the interior controlling-plug can instantly be thrown out of gear.

My invention also consists in placing a lever immediately in front of the driver's seat, by depressing which the hind part of the machine is raised, the whole weight of the machine being then thrown on the two pivot-wheels or casters, $f'' f''$, which connect by suitable levers with the lever in front of the driver, thus enabling him to easily swing the machine round when turning a furrow, the shovels being so raised as not to touch the ground.

To enable others skilled in the art to make and use my invention, I will now proceed to describe its construction and operation.

A is the frame of the machine, which is constructed with a platform having two projecting arms, $A^1 A^1$, provided with suitable slots or openings, $A^2 A^2$. At the opposite end of this frame, in these slots $A^2$, work two driving-wheels, $D' D'$.

In the extended arms $A^1$ there are suitable slots or openings, $d^3$, which readily allow of the revolution of the wheel without any impediment.

In the hopper B, at its base or the point of distribution, I insert and firmly attach a suitable tube, H. This tube H may be made of any metal, or other suitable material, and is provided with slots arranged in an angular form. In this tube H works a plug or arm, $h$, which is controlled first by an outside lever, B', which has, near its upper end, an actuating-arm or lever, H', with a lip, $h^2$, so arranged as to strike the flanges $e'$ on the driving-wheel D'. To this inner plug or arm $h$, which works in the tube H, I attach a needle, $h'$, whereby I am enabled, should any obstruction be encountered by the driving-wheel D', such as heavy clods of earth, rocks, &c., to close the tube H, and thereby cause the machine to pass over the obstruction without dropping the grain. The action of the needle H' will of necessity be such as to close the tube H.

$f' f'$ are two casters, placed at the rear end of the machine, which have their bearings at suitable points, $ff$, as clearly shown in fig. 3. These casters are attached to and work in two uprights, F F, as is clearly shown in figs. 3 and 4, whereby the rear of the machine can readily be elevated for the purpose of transportation, &c.

G' is a suitable cross-lever, which connects with suitable rods, $g^3$, at each end, which are connected with levers, $g^2 g^2$, which in turn connect with the levers that elevate the mechanism.

Thus it will be seen that, by the driver or operator placing his foot on the lever G', when he desires to turn a furrow, he can elevate the entire mechanism.

$C^2 C^2$ are two covers or shovels, which are attached to the sides of the machine by an arm, $c$, the operation being such, that after the grain has been dropped into the furrow, they cover the same.

I' is an ordinary shovel, attached to a projecting beam, C, whereby the furrow is opened for the reception of the grain.

Having thus fully described my invention, what I claim therein as new, and desire to secure by Letters Patent of the United States, is—

1. The tube H, when the same is constructed with angular openings and supplied with a plug, $h$, in such manner that the same can be actuated by the driving-wheel D', or controlled by the upright lever or needle $h'$.

2. The foot-lever G', when in combination with suitable mechanism, and the universal casters $f' f'$, when the same is so constructed and arranged substantially as described and for the purpose specified.

In testimony whereof, I have signed my name to this specification in the presence of two subscribing witnesses.

WILLIAM McLUCAS.

Witnesses:
 WM. J. ALLEN,
 WASHINGTON FORD.